Dec. 17, 1968  L. C. NICKELL ET AL  3,417,252
FABRIC FLAW DETECTING APPARATUS USING PHOTOELECTRIC
SENSING HEAD TRAVELING ON A TROLLEY WITH
BRUSHES ENGAGING A CONDUCTIVE STRIP
Filed Dec. 15, 1966  8 Sheets-Sheet 1

INVENTORS
LAWRENCE CREIGH NICKELL,
RAYMOND BAINES FERTIG &
CURTIS L. PERKINS
BY
Mason, Fenwick & Lawrence
ATTORNEYS

INVENTORS
LAWRENCE CREIGH NICKELL,
RAYMOND BAINES FERTIG &
CURTIS L. PERKINS

BY Mason, Fenwick & Lawrence
ATTORNEYS

Dec. 17, 1968

L. C. NICKELL ET AL  3,417,252

FABRIC FLAW DETECTING APPARATUS USING PHOTOELECTRIC
SENSING HEAD TRAVELING ON A TROLLEY WITH
BRUSHES ENGAGING A CONDUCTIVE STRIP

Filed Dec. 15, 1966

INVENTORS
LAWRENCE CRAIGH NICKELL,
RAYMOND BAINES FERTIG &
CURTIS L. PERKINS

BY Mason, Fenwick & Lawrence

ATTORNEYS

United States Patent Office 3,417,252
Patented Dec. 17, 1968

3,417,252
FABRIC FLAW DETECTING APPARATUS USING PHOTOELECTRIC SENSING HEAD TRAVELING ON A TROLLEY WITH BRUSHES ENGAGING A CONDUCTIVE STRIP
Lawrence Creigh Nickell and Raymond Baines Fertig, Ronceverte, and Curtis Lee Perkins, Frankford, W. Va., assignors to Appalachian Electronic Instruments Incorporated, Ronceverte, W. Va., a corporation of West Virginia
Filed Dec. 15, 1966, Ser. No. 602,021
20 Claims. (Cl. 250—219)

ABSTRACT OF THE DISCLOSURE

A fabric flaw detecting apparatus having a detector head of either the reflective or retroreflective type including a pair or a single phototransistor, and an amplifier unit, both mounted on a trolley movable back and forth on a horizontal rail of upwardly opening channel-shaped configuration, the trolley having upper and lower wheels tracking in the interior of the rail and having contact brushes in sliding contact with a contact strip within the rail spanning the path of trolley travel. The traveling subassembly includes a lamp regulator which normally draws current through the brush and contact strip arrangement and through a relay coil in a relay and resistor arrangement in a stationary circuit subassembly to maintain a relay in a condition preventing production of stop signals for stopping a knitting machine or visual alarm signals. Upon detection of a fabric flaw by the detector head a silicon controlled switch is activated to cut off or drastically reduce current drawn by the lamp regulator and lamp controlled thereby to reduce current drawn through the relay coil to a level causing it to drop out and produce stop and/or alarm signals.

---

The present invention relates in general to fabric flaw detector systems for detecting flaws in textile fabrics, and more particularly to optical scanning apparatus and associated circuitry for scanning textile fabrics, particularly for scanning transversely across the width of flat textile fabrics issuing from a knitting machine, such as a tricot knitting machine, to detect flaws, such as holes and runs in the fabric immediately after the fabric leaves the zone of the needles.

The desirability of promptly detecting holes, runs, or similar aperture flaws in knitted fabrics as the fabric leaves the zone of the needles of a knitting machine so that the machine can be immediately stopped to minimize production of defective fabric and reduce consequent wastage of materials and time has been long recognized. Such fabric scanning and flaw detecting systems have been commonly referred to in the trade as "stop motion devices," and have been used for many years on tricot knitting machines of the type which produce flat fabric webs. In such cases, a photoelectric sensing head is scanned transversely across the fabric, which may either be back-illuminated or front-illuminated by a stationary light source, or may be illuminated by a light source which is scanned in coordinated relation with the detector head (usually by incorporating both the photocell and light source in the same detector head structure). Holes or similar flaws in the fabric produce a variation in light sensed by the photocell, producing an output signal which activates appropriate circuitry to produce an alarm indication and/or stop the knitting machine.

A number of significant objections have been raised by mill operators to the types of tricot scanning devices for fabric flaw detection which have been heretofore commercially available. Such prior scanning devices have customarily employed a photoelectric scanning head mounted on a travelling carriage which is supported for rectilinear movement transversely of the cloth on a horizontal rail spaced above the cloth, with the scanning head electrically connected to amplifier circuitry mounted in a stationary container, usually at one end of the rail, by means of a dangling head cord or cable by which the error signal from the head, which is usually of low signal to noise ratio, is transmitted to the amplifier circuitry. The head cord, of course, must be of sufficient length to permit the scanner head to travel to the end of the trolley rail remote from the location of the amplifier container and usually dangles down from the rail when the scanner head is disposed at positions located nearer to the amplifier circuitry. This dangling head cord arrangement has been a source of much objection, as it not only has to be replaced frequently, but collects dust and dirt which eventually fall on the cloth. The clothesline appearance is also very objectionable.

Efforts have been made to avoid the objectional appearance and exposed nature of such a head cord extending between the scanner head and the amplifier circuitry, by using a head cord which is hidden in the rail and is trained around pulleys to maintain the head cord in taut condition regardless of the position of the scanning head. This introduces problems of rapid wear, as the training of the head cord around pulleys gives it a bending effect which causes it to fail rather frequently. Replacement of the head cord is difficult and time consuming.

It has also been a common practice to support the carriage on which the scanning head is mounted by wheels which run on the side of the supporting rail. This has been found to produce undesirable effects, as the wheels knock paint off from the rail onto the cloth, adversely affecting the quality of the cloth.

While the use of sliding contacts and a stationary bus-bar or contact strip arrangement would eliminate the problems incident to the use of the dangling head cord, it has been heretofore considered that such an expedient is impractical where the amplifier circuitry is separate from the detector head, because of the low signal levels which are produced by the photocell system upon detection of fabric flaws and the high noise levels produced by sliding contact systems which would effectively mask the low level detector output signals and render them difficult to reliably monitor.

Improvement is also desired in the facilities for effecting reversal of the detector head and carriage at their limit of travel, to increase the life of limit switches if limit switches are used, by reducing the current and voltages carried thereby, or to improve the reliability with which the scanner head is reversed at the desired location and is stopped at the same place in relation to the edge of the cloth, relative to the conditions obtainable when friction type slipping clutches are used for reversing the head. Further, it is desired that the system be readily adaptable to use with different types of detector heads with minimum alteration of the system, to make it possible to work with a great variety of fabrics including those which are multi-colored and striped as well as with single colored fabrics.

An object of the present invention, therefore, is the provision of a novel scanning system for detecting fabric flaws, wherein the foregoing disadvantages are obviated.

Another object of the present invention is the provision of a novel scanning system for detecting fabric flaws, wherein the usual dangling head cord is eliminated and a sliding contact and bus-bar arrangement provides the necessary electrical connections between the travelling scanning head and the stationary circuitry of the system.

Another object of the present invention is the provision of a novel fabric scanner for detecting fabric flaws employing a novel travelling scanning head sub-assembly connected by sliding contact and bus-bar arrangement with stationary control circuitry wherein error signals generated in the detector head responsive to fabric flaws are changed into a "GO/NO-GO" type signal of large amplitude which is transmitted through the sliding contact and bus-bar to the stationary circuitry to produce visible alarm signals signifying detection of a fault or stop the knitting machine as desired.

Another object of the present invention is the provision in a scanning system for detecting fabric flaws wherein a detector head is scanned transversely across the fabric by a supporting carriage moving on a horizontal rail, of novel plunger type switch means at each end of the scanner head travel for reversing the travel of the detector head.

Yet another object of the present invention is the provision of a novel scanning system for detecting fabric flaws wherein solid state devices are used in place of electronic tubes, greatly increasing the reliability thereof and decreasing the size and weight of the system components; wherein a plurality of types of detector heads may be used in the system to facilitate flaw detection with a greater variety of fabrics, including fabrics which are multicolored or striped as well as single colored fabrics; wherein faster scanning speeds are obtainable; and wherein reliable fail-safe operation is insured.

Other objects, advantages, and capabilities of the present invention will become apparent from the following detailed description, taken in conjunction with the accompanying drawings, illustrating a preferred embodiment of the invention.

Figures 1, 3, 4:
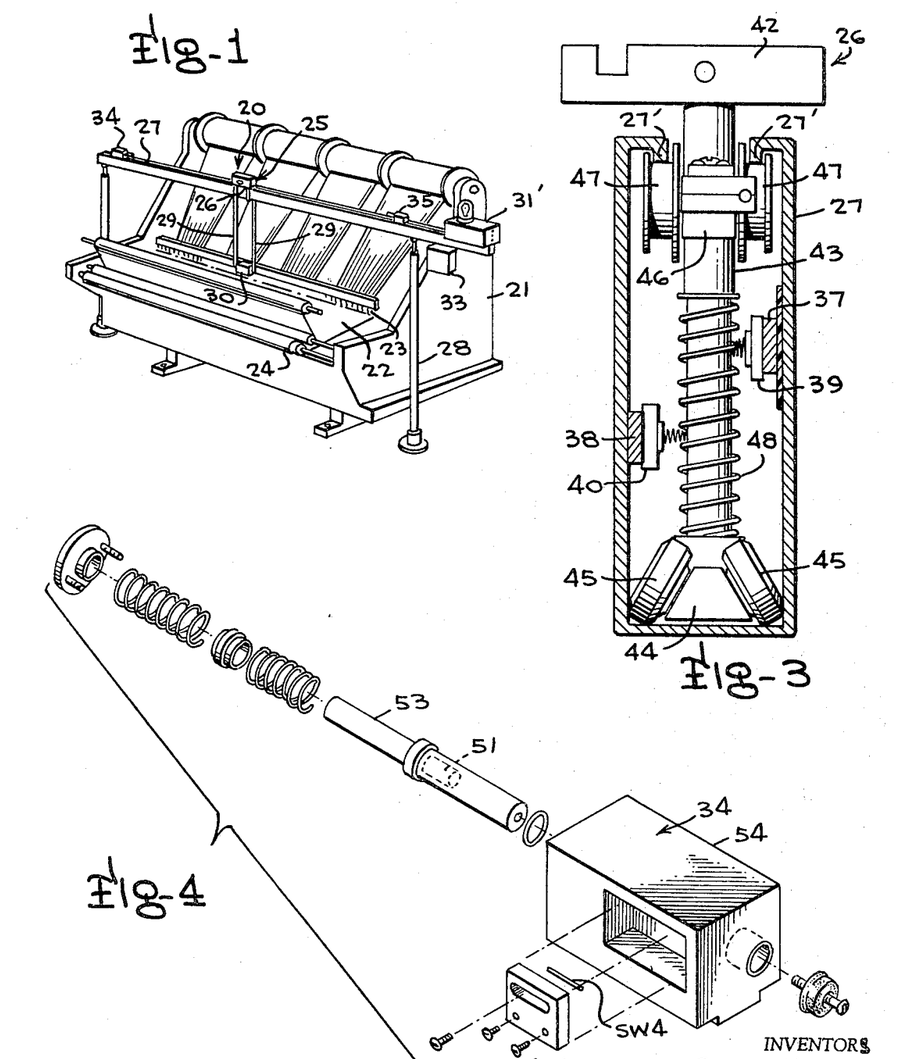
FIGURE 1 is a perspective view illustrating the general physical arrangement of the fabric flaw detecting system of the present invention in association with a tricot knitting machine.
FIGURE 3 is a vertical transverse section view through the trolley assembly taken along the line 3—3 of the FIGURE 2.
FIGURE 4 is an exploded perspective view of one of the plunger type limit switches.

Referring to the drawings, wherein like reference characters designate corresponding parts throughout the several figures, the general physical arrangement of the fabric flaw detecting scanning system of the present invention in association with a knitting machine, such as a tricot knitting machine, is as illustrated in FIGURE 1. As there shown, the detector head assembly 20 of the fabric flaw detecting scanner is mounted in relation to the knitting machine 21 so as to scan transversely across the width of the cloth 22 as the cloth leaves the knitting machine in the region between the needle zone 23 and the conventional take-up roll 24, preferably as near to the needle zone 23 as possible. The detector head assembly 20 includes a main amplifier unit 25 contained in a housing 25' mounted on a trolley 26 movably supported on a horizontal rail 27 which spans the width of the cloth 22 and is supported adjacent its opposite ends by suitable vertical posts or stanchions 28 rising from the floor of the room in which the machine 21 is located. A pair of depending support rods 29 extend downwardly from the trolley 26 and housing 25' to support at their lower ends near the cloth 22 a detector head 30 which includes therein a detector head preamplifier. Mounted at a stationary location on an end of the rail 27, for example, an extension of the rail which projects outboard from one of the posts 28, is an amplifier control unit 31 containing a plurality of relays and resistors in a preselected combination, as well as a regulated power supply and a time-delay circuit. Electrically connected to the amplifier control unit 31 is a control relay unit 32 which may be housed in the same housing 31' for the amplifier control unit 31 or may be located in a separate stationary housing, and a motor control unit 33, preferably located in another housing box supported from the rail 27 is also electrically connected with the amplifier control unit 31 and is connected to left and right plunger limit switch assemblies 34 and 35 located on the rail at the opposite limits of travel of the trolley 26 and main amplifier unit housing 25' to reverse the direction of travel of the trolley 26. A suitable drive motor 36 is also electrically coupled to the motor control unit and is mechanically coupled to the trolley by means of a suitable cable or drive cord connected at its opposite ends to the trolley and trained around pulleys at opposite ends of the rail or around a pulley at one end of the rail and a motor driven drum at the other end of the rail to drive the trolley 26.

To briefly describe the system, approximately 118 volts AC is applied to the primary of a step-down transformer in the amplifier control unit 31 to apply approximately 36 volts AC to a regulated power supply in the amplifier control unit 31 having a 28 volt DC output. This eliminates the need for a line voltage regulator. The 28 volt DC output is applied to a parallel resistor-relay arrangement in the amplifier control unit 31 through a manual reset switch. The other side of the resistor relay combination is connected to one of two copper contact rails or bus-bars 37, 38 incorporated in the trolley rail 27, for example bus-bar 37, which is engaged by a brush 39 sliding on the rail to conduct the regulated DC output to the main amplifier 25. The other contact rail or bus-bar, for example, contact rail 38, is engaged by an additional brush 40 carried by the trolley 26 to carry the negative or ground side of the regulated DC output. The voltage on the contact rail 37 is only about 22 volts DC due to the drop across the resistor-relay combination in the amplifier control unit 31. This voltage is further filtered and regulated by an RC filter and Zener diode combination in the amplifier 25 to eliminate any noise caused by the brushes. This voltage is used to supply current to the detector head 30, the amplifier 25 and a silicon controlled switch contained therein as well as supplying the power for illuminating the lamp or lamps carried by the detector head 30.

The detector head assembly 20 is made to scan across the cloth 22 by the motor 36, which is a reversible motor, the two plunger switches 34 and 35, one mounted on each end of the trolley rail 26, causing the motor 36 to reverse as the detector head reaches the edge of the cloth. When a flaw is detected by the detector head 30, an electrical signal is generated at the output of a pre-amplifier included in the detector head, which is fed to the main amplifier 25 and the light regulator circuit located in the main amplifier housing 25' mounted on the trolley 26. This signal is amplified and applied to a gate circuit of a silicon controlled switch in the amplifier unit 26, which it fires. This causes the light regulator to cut off the current to the detector head lamp. Since the current for this lamp is normally flowing through a relay in the amplifier control unit, this relay falls out, actuating control contacts and other relays which in turn stops the knitting machine and produces a visible alarm, such as illuminating a stop-indicator lamp 41. Because the system relies upon the cutting off of the current to the detector head lamp in response to the firing of the silicon controlled switch due to the error signal applied thereto, a high level change in current flowing through the contact rail 37 and brush 39 from the stationary amplifier control unit 31 to the moving amplifier 25 is caused to occur which provides a "GO/NO-GO" type signal of large amplitude which can be readily transmitted through the bus-bar or contact rail and brush communication path to effect stopping of the knitting machine responsive to flaw detection.

Figure 2:
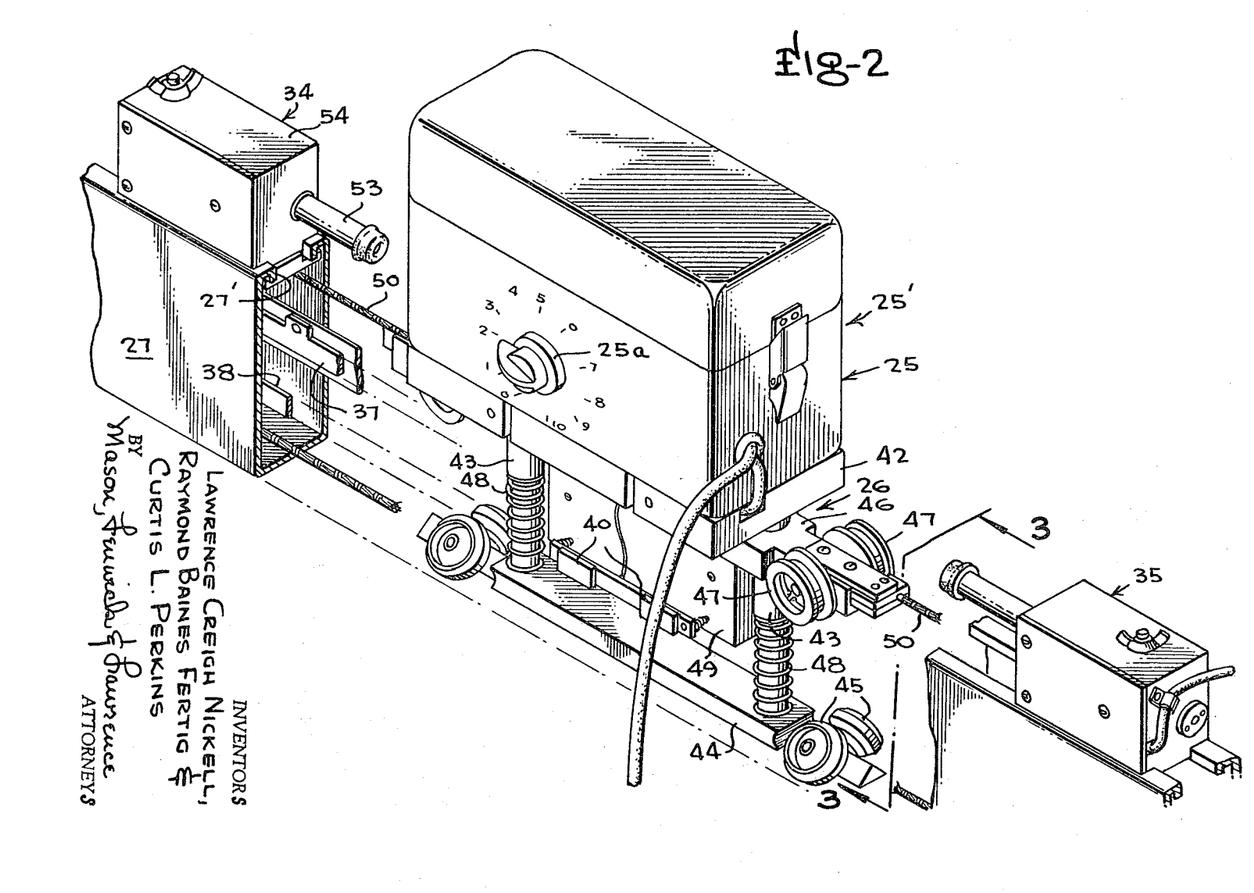
FIGURE 2 is a fragmentary enlarged perspective view of the trolley and amplifier housing components of the travelling detector head sub-assembly and of the plunger type limit switches employed in the system.
Figure 5:
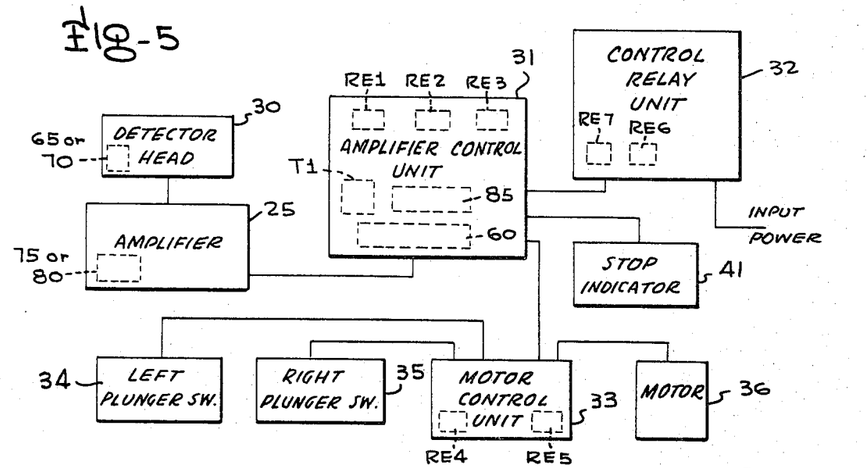
FIGURE 5 is a block diagram of the fabric flaw detecting scanning system.

Referring now in greater detail to the drawings, and particularly to FIGURES 2 and 3 illustrating mechanical details of the trolley and detector head mechanism, the trolley supporting rail 27 is of upwardly opening substantially channel-shaped formation providing a hollow interior.

The bus-bars or contact rails 37, 38 are, in the preferred embodiment, supported on suitable insulation panels at different vertical levels on the opposite sides of the trolley rail 27 with their contact faces facing inwardly. The trolley mechanism comprises a base member 42 on which the amplifier housing 25' is supported, having a pair of depending rods 43 which extend downwardly into the trolley rail 27 and are connected at their bottom by an elongated rigid compression plate 44 carrying two pairs of wheels 45, the wheels of each pair lying in planes which diverge downwardly and outwardly so that the wheels track in the lower corners of the trolley rail 27. An upper compression plate 46 is apertured to slide freely on the rods 43 and has two pairs of wheels 47 lying in vertical plane which bear upwardly against the lips 27' of the trolley rail 27 bounding the upper opening in the trolley rail. The upper compression plate 46 is spring loaded upwardly by the spring 48 to hold the wheels thereof in position and to prevent wobble. It is apparent, of course, that the upper compression plate 46 may be fixed to the rods 43 and the lower compression plate 44 may be freely slidable on the rods and spring loaded downwardly to obtain a like effect.

An insulating panel 49 is carried by the trolley within the trolley rail 27 and supports the pair of brushes 39 and 40, which may be silver graphite brushes spring-loaded outwardly to insure good electrical contact with the bus-bars 37, 38 with minimum wear. The trolley 26 is moved by means of a motor driven cable 50 attached to removable clamps at each end of the trolley 26 and suitable pulleys attached to each end of the trolley rail 27. The main amplifier housing 25', as previously described, is mounted on top of the top plate or base member 42 of the trolley and power to the amplifier unit 25 is supplied through a mating plug on the bottom of the top plate 42. The depending pair of support rods 29 which support the detector head 30 immediately above the level of the cloth 22 are fixed to the top plate 42 at a portion thereof which projects beyond the sides of the trolley rail 27 and depend downwardly below the rail to the level of the detector head 30.

The two plunger switch assemblies 34 and 35 used for automatically reversing the motor 36 are of the magnet and reed switch type, of the construction illustrated in FIGURE 4, and are identical except for the position of the magnets inside the plungers. In the left plunger switch 34, the magnet, indicated by the reference character 51, is opposite the reed switch which causes it to be normally closed. The magnet 51 in each case is mounted in an axially reciprocative plunger 53 supported in the switch housing 54, the plunger being biased to the projected position by conventional springs surrounding the plunger and located within the housing 54. In the right switch 35, the magnet is located away from the reed switch in a portion of a plunger which is either normally exposed from the housing 54 or at least is spaced toward the contact end of the plunger from the location of the reed switch. This causes the reed switch in the switch assembly 35 to be normally open and to close when the plunger is pushed into the assembly by the trolley. The springs in both switches 34 and 35 are identical. Two such springs are provided in each unit arranged in serial or axially spaced fashion, the spring opposite the reed switch being much stiffer than the other spring, to enable the trolley to compress the first spring easily and actuate the reed switch while the other spring limits the travel and causes the trolley to stop at a definite place near the edge of the cloth. The plunger switch assemblies 34, 35 are positioned on the trolley rail 27 by means of a screw extending through the rail slot 27' and attached to a block within the rail to permit adjustment of the assemblies to any desired location on the rail.

Figure 6:
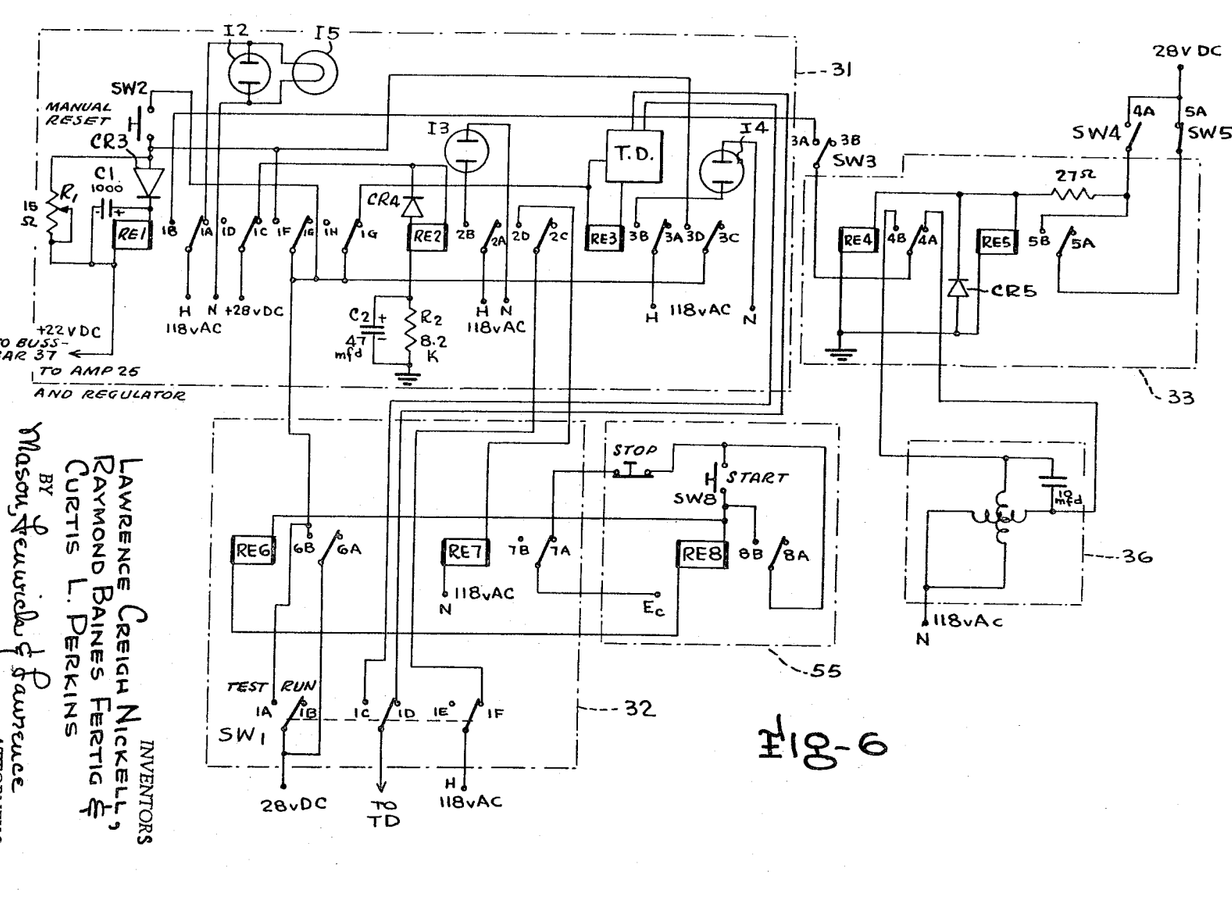
FIGURE 6 is a schematic diagram of the relay circuitry for the fabric scanner, illustrating relay circuit stages found in each of the amplifier control unit, the control relay unit, and the motor control unit.

FIGURE 6 illustrates in electrical schematic diagram form the relay circuitry of the flaw detector system, including the relays RE1, RE2 and RE3 located in the amplifier control unit 31, the relays RE4 and RE5 located in the motor control unit 33, the relays RE6 and RE7 located in the control relay unit 32, and the machine control relay RE8 and its associated circuitry in the machine control unit 55 for controlling the knitting machine 21. The coil of relay RE1 is connected at one end through diode CR3 and through either Manual Reset Switch SW2 or relay contact 1F, and through contact 6B of relay RE6 to the 28 volt DC regulated supply from the regulated power supply in amplifier control unit 31, and at its other end is connected to the bus-bar 37 and brush 39 to the amplifier and light regulator (to be later described) for the detector head lamp or lamps, so that current for the detector head lamps normally flows through relay RE1 to maintain the same in energized condition. When a flaw is detected by the detector head 30, the light regulator is caused to cut off current to the detector head lamp, which in turn causes relay RE1 to fall out, closing its contact 1C. This applies 28 volts DC through the contact 1C to the relay RE2, causing a momentary flow of current through relay RE2 due to the charging current of capacitor C2, a 47 mfd. capacitor, connected in series with relay RE2, which energizes this relay for a short time. After capacitor C2 becomes charged, relay RE2 falls out. When relay RE2 is energized, it contact 2D is closed, which energizes relay RE7 connected therewith, opening its contact 7A and thereby breaking the voltage supply to the holding contact 8B of the relay RE8 in the machine control unit 55. This causes relay RE8 to fall out, which stops the knitting machine 21 through another set of contacts of the relay RE8 (not shown).

After a flaw has been detected and the machine stopped, the operator closes the start switch SW8 for the machine control relay RE8 which causes the holding coil contact 8B to close, latching in relay RE8. Since the coil of the matching relay RE6 is connected in parallel with the coil of relay RE8, it is also energized. The term matching relay is used because the coil voltage of relay RE6 must match the coil voltage of relay RE8 which may vary on different machines. When relay RE6 becomes energized, 28 volts DC is applied through contact 6B of relay RE6 and contact 1G of relay RE1 to the time delay circuit T.D. This starts the timing cycle and at the end of the timing period determined by the setting of the T.D. control in the amplifier control unit 31, relay RE3 is energized. This closes contact 3D on relay RE3 and completes the circuit to the coil of relay RE1. This energizes relay RE1 and opens the 28 volts DC line to the timing circuit thus preventing it from going through another timing cycle. Contact 1B on relay RE1 is also closed, which starts the reversing motor 36. The purpose of the time delay T.D. is to let the knitting machine 21 knit by the flaw without another shut down. There is also another time delay of a few seconds built into the amplifier 25 which prevents any relay switching transients from triggering the silicon control switch SCS (to be described) and causing a false stop. After this short time delay, the scanner is ready to detect another flaw.

When the TEST-RUN switch SW1 is in the Test position, the scanner can be operated with the machine 21 either stopped or running. However, the scanner cannot stop the machine 21 due to the contact 1F of switch SW1 being open and cutting off power through contact 2D of relay RE2 to relay RE7 and preventing contact 7A in the holding coil circuit of relay RE8 from opening. The main purpose of the TEST-RUN switch SW1 is to enable the operator to adjust the sensitivity control 25a on the amplifier 25 to the level where all flaws are detected and the scanner does not false stop.

Operation of the relay circuitry is essentially the same in the Test position of switch SW1 with the exception of contact 6B of relay RE6 which is by-passed by contact 1A on switch SW1. This enables the scanner to operate with the machine 21 either stopped or running. When switch SW1 is in the Test position, contact 1C of switch SW1 switches in a fixed resistor in the time delay circuit T.D. so that only a short time elapses between the stopping and automatic starting of the scanner. In the Run position of switch SW1, this time delay could be as long as 90 seconds which if used in the Test position would waste too much time.

A reversing motor switch SW3 is provided for stopping the motor 36. Power is removed from the 3A contact of switch SW3 which prevents the reversing motor 36 from receiving power through contacts 4A and 4B of relay RE4. Relay RE5 is the latching relay for relay RE4. It is used instead of a second set of contacts on relay RE4 because relay RE4 is a heavy duty relay having 15 ampere contacts and is somewhat sensitive to vibration. Relay RE5 is a small relay much less sentitive to vibration and having contacts more suitable for the low coil current of relay RE4. Heavy duty contacts sometimes give trouble when operated at low currents and voltages.

Operation of the reversing relay circuitry is as follows: 118 volts AC is applied to one winding of the motor 36 through contact 3A of switch SW3 and contact 4A of relay RE4. This causes the motor 36 to rotate in the direction which will cause the trolley 26 to engage the plunger for reed switch SW4 located near the edge of the cloth on the scanner rail. This closes contact 4A of switch SW4 and energizes relay RE5 through resistor R3. This closes contact 5B of relay RE5 which energizes relay RE4. 118 volts AC is switched through contact 4B of relay RE4 to the other winding of the reversing motor 36, causing it to reverse. Relays RE4 and RE5 are latched in by contact 5B of relay RE5. Resistor R3 is used to drop the 28 volts DC supply voltage to about 24 volts DC for the coils of relays RE4 and RE5.

When the motor 36 reverses, it causes the trolley 26 to travel in the direction of reed switch SW5. It engages the plunger for reed switch SW5 and causes it contact 5A to open, thus breaking the latching circuit of relay RE5 and causing relays RE4 and RE5 to drop out. This starts the reversing cycle over again.

Figure 7:
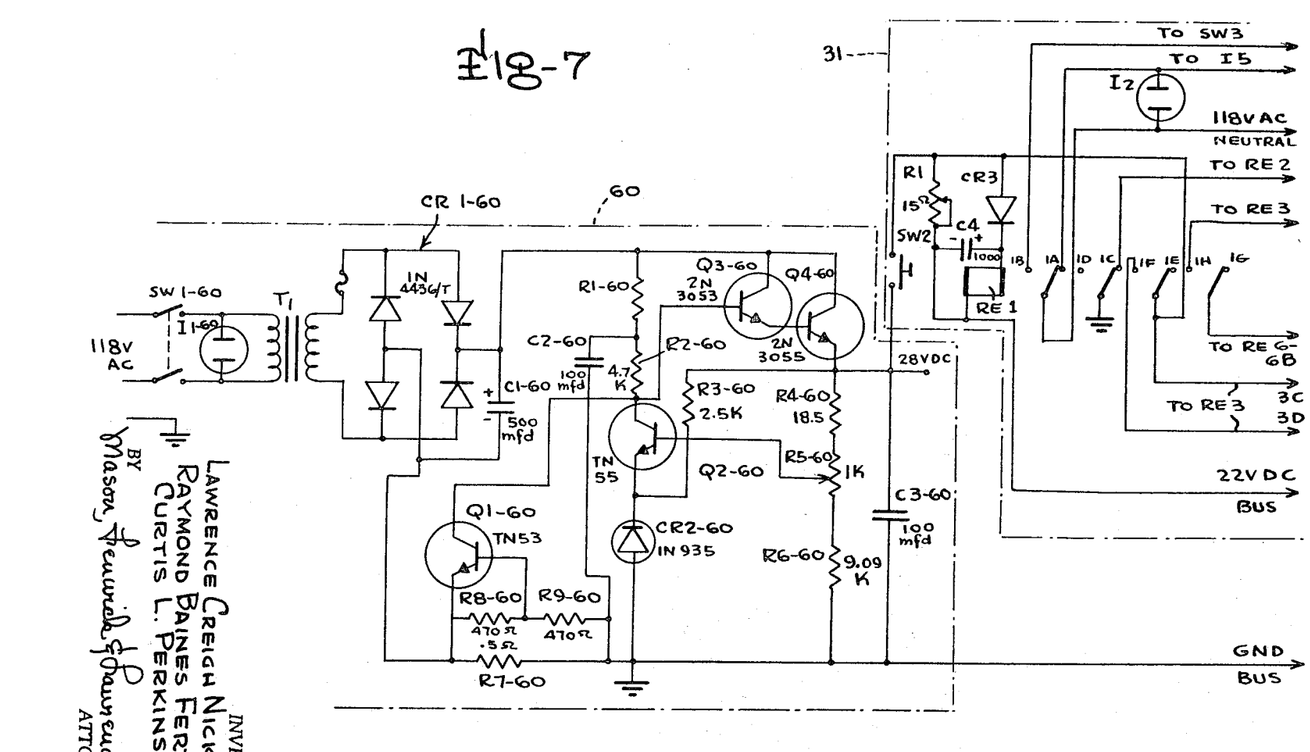
FIGURE 7 is a schematic diagram of the regulated power supply circuitry in the amplifier control unit.

The 28 volts DC regulated power supply, schematically shown in FIGURE 7 and indicated by reference character 60, is located in the housing for amplifier control unit 31 and supplies power for all the electronics used in the scanner including the main amplifier 25 and the lamp regulator located on the trolley assembly. It is a conventional feedback type regulator with a built in current limiter. If the 22 volt DC bus-bar 37 should become grounded, the regulator 60 automatically limits the current to a safe value which will in a short time blow the fuse, thus preventing damage to any of the transistors or other components. It will also take care of any normal 118 volt AC line variations, making a line voltage regulator unnecessary.

Referring to FIGURE 7, a switch SW1-60 supplies 118 volts AC from the control relay unit 32 to the transformer T1, which is a step-down transformer with a 36 volt AC secondary winding. The primary has across it a neon indicator lamp I1-60, having a built in current limiting resistor (not shown), to show that power is on the unit. A full wave bridge rectifier CR1-60 is connected across the secondary of transformer T1. The output voltage of CR1-60 is filtered by a capacitor C1-60 and applied to another R-C filter consisting of resistor R1-60 and capacitor C2-60 which supplies a low ripple content voltage to the DC amplifier transistor Q2-60. The output of CR1-60 is also applied to the collectors of transistors Q3-60 and Q4-60. A voltage divider consisting of resistors R4-60, R5-60 and R6-60 is connected from the emitter of transister Q4-60 to ground. Q4-60 is the main power transistor and is located on the outside of the housing on a heat sink for cooling purposes. There is a Zener diode CR2-60 connected to 28 volts DC output of the regulator 60 through a resistor R3-60. R3-60 sets the correct current for CR2-60. The voltage across CR2-60 is the reference voltage for the regulator 60 and is connected to the emitter of transistor Q2-60, the DC amplifier. The base of Q2-60 is connected to the slider of potentiometer R5-60 which is used to adjust the regulator to an output voltage of 28 volts DC. If there is a change of voltage on the base of Q2-60, this change is amplified, inverted and fed back to Q3-60 which causes Q4-60 to change resistance in such a direction as to correct for the initial voltage change. R2-60 is the collector load resistor for Q2-60. Q3-60 and Q4-60 are connected in a Darlington type arrangement to prevent Q4-60 from loading Q2-60.

Transistor Q1-60 is the current limiting part of the circuit and operates as follows: all the current from the regulator flows through resistor R7-60. Normally this is about 1 ampere and develops a voltage of about .5 volt DC across R7-60. Across R7-60 is a voltage divider consisting on resistors R8-60 and R9-60. The voltage from the emiter to the base of Q1-60 is normally about .25 volt DC. If a short is connected across the 22 volts DC bus bar 37 to ground, more current than 1 ampere flows through R7-60.' This increases the voltage drop across R7-60 and at about 1.5 amperes, enough positive bias is applied to the base of Q1-60 to cause it to conduct. The collector of Q1-60 is connected to the base of Q3-60. Any current flow through Q1-60 increases the voltage drop across R2-60 which in turn decreases the forward bias on Q3-60 and Q4-60. This increases the resistance of Q4-60 to a high enough value to prevent the output current from reaching a value which could damage Q4-60 or any of the other components.

The main control relay RE1 and relays RE2 and RE3 are also located in this housing. Relay RE1 is connected through the diode CR3 to the 28 volt regulator and is connetced to the 22 volts DC bus bar 37. Across the coil of relay RE1 is a capacitor C4 which prevents any momentary loss of contact through the brushes 39, 40 from causing relay RE1 to fall out and stop the knitting machine. Across the series combination of CR3, RE1 is a resistor R10 which is adjusted to provide relay RE1 with the proper operating voltage. About 5.5 volts DC is sufficient as there is a surge of current when the circuit is first energized. CR3 is used to isolate the coil of relay RE1 from resistor R10, which if not used would tend to short out capacitor C4 and shorten the holding time of relay RE1.

As was previously mentioned, the system of the present invention is designed to use a reflective type detector head for white cloth, or a retroreflective type detector head for multi-colored and certain types of solid colored fabrics. In either case, the optical and mechanical nature of the head is similar to that disclosed in U.S. Patent No. 3,046,767, except that a pair of phototransistors are used instead of the photocells of said patent and the mask of said patent has been eliminated, since the phototransistors are somewhat smaller and less sensitive to light. A preamplifier is required to increase the output of the detector head and is included in the head. The phototransistors are much more stable with temperature (thus requiring less warm up time) than the photocells, and have a much better frequency response. This means that the scanning speed is only limited mechanically and not electrically. Scanning speeds of about twice that attainable with the photocell type head are practical as well as desirable when used with high speed knitting machines. The signal to noise ratio is also much improved. Photoconductive type cells fall off drastically at high frequencies, making the detection of small flaws at high scanning speeds very difficult. Operation of the head optically is the same as the type of said patent.

Figures 8, 9:
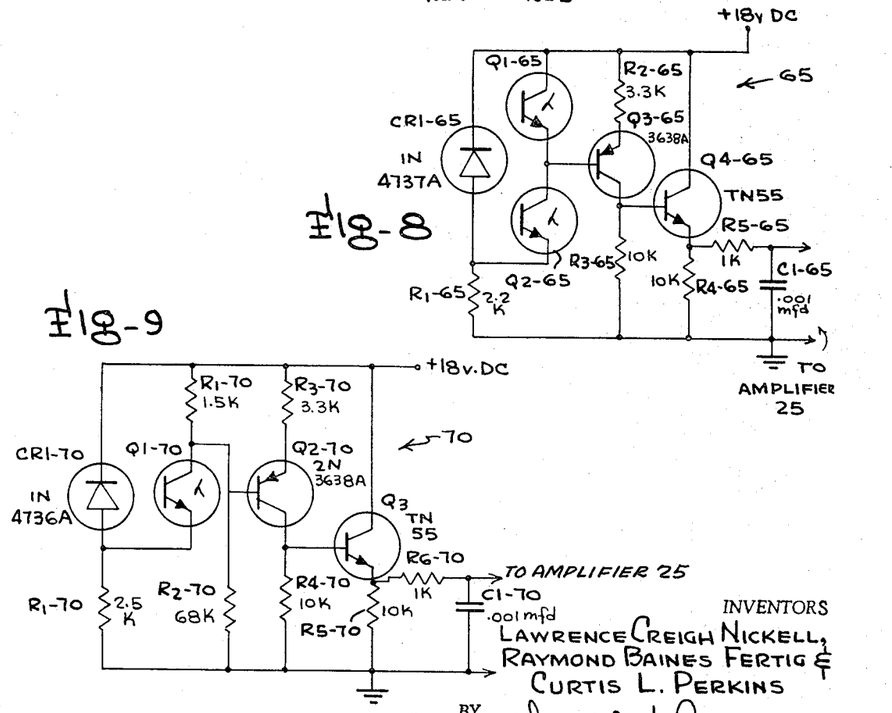
FIGURE 8 is a schematic diagram of the electronic circuitry employed with a reflective type scanner head which may be used with certain types of cloth, such as some types of white cloth and single colored cloth.
FIGURE 9 is a schematic diagram of the electronic circuitry employed in a retro-reflective scanner head for use on colored cloth and other types of white cloth.

The reflective type head responds to light reflection from the fabric in the manner described in said patent, the electrical circuitry being schematically illustrated in FIGURE 8 and indicated generally by the reference character 65. Referring to FIGURE 8, the 18 volts DC from the main amplifier 25 is fed to a zener diode CR1–65 and resistor R1–65 in series to ground. Resistor R1–65 sets the zener current to the proper value while the voltage drop across the zener is used to supply current to the phototransistors Q1–65 and Q2–65. The zener diode greatly improves the stability of the power supply for Q1–65 and Q2–65 and further removes any power supply noise. Q1–65 and Q2–65 are connected in series and for best results should be of equal sensitivity to produce best cloth flutter noise cancellation. If equal light signals are applied to both Q1–65 and Q2–65, little output will result if they are properly matched. However, a flaw will strike one before the other and result in a positive pulse followed by a negative pulse applied to the base of transistor Q3–65, assuming the flaw reaches Q1–65 first and is of such a nature as to cause a decrease in light on Q1–65. If the scan is in the reverse direction, a negative pulse followed by a positive pulse is produced. Normally a voltage of about 14.25 volts DC exists on the base of Q3–65 which produces enough forward bias to cause Q3–65 to conduct. A positive pulse on the base of Q3–65 causes it to draw less current while a negative pulse causes it to draw more current since Q3–65 is a PNP type transistor. These changes in current through Q3–65 produce negative and positive pulses across the collector load resistor R3–65. The un-bypassed emitter resistor R2–65 for Q3–65 is used to supply proper biasing and to increase the input resistance of Q3–65 so as to not load Q1–65 and Q2–65. It also provides negative feedback for stabilizing Q3–65. The collector of Q3–65 is direct coupled to the base of Q4–65, an emitter follower. Q4–65 prevents loading of Q3–65 and provides a low output impedance. Connected to the emitter load resistor R4–65 is an R-C filter consisting of R5–65 and C1–65. This filter eleminates any high frequency noise signals which could be picked up by the head including relay switching transients produced by the motor reversing relay.

Figure 14:
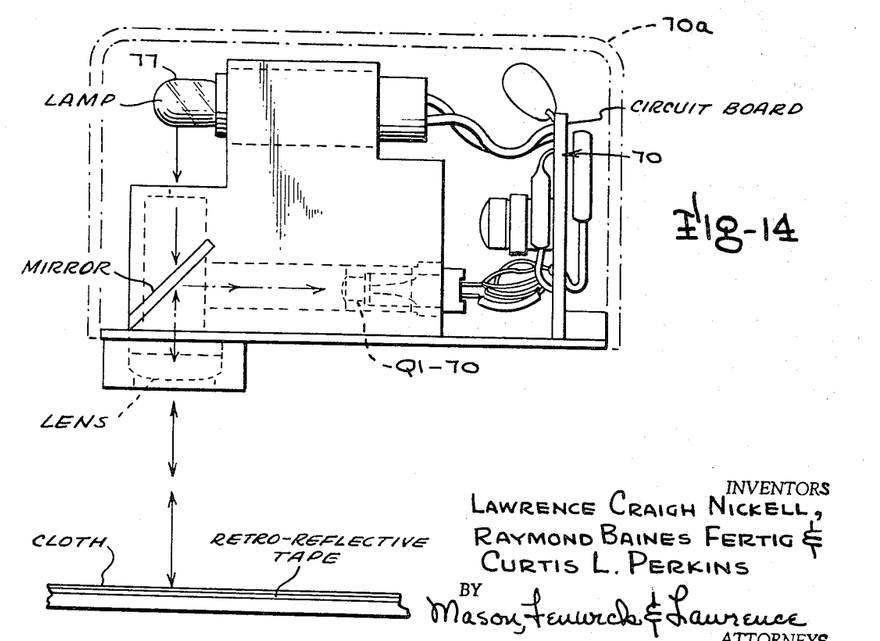
FIGURE 14 is a somewhat diagrammatic elevation view of a detector head usable with the retroreflective type system.

Optically, the retroreflective type detector head is the same as the reflective type, except that a semi-transparent mirror transmits light from a single lamp through the lens toward the fabric, a retroreflective tape or strip, such as Scotch Lite or similar material, is disposed under the fabric in the scanning path of the optical field of the lens, and only one phototransistor is used. A somewhat diagrammatic illustration of the retroreflective type head is shown in FIGURE 14 and is designated by reference character 70a. The electrical circuitry of the retroreflective type detector head is schematically illustrated in FIGURE 9 and is designated by reference character 70. The preamplifier is very similar in circuitry and operation to the preamplifier for the reflective type head. The zener diode CR1–70 is changed to a 6.8 volts DC unit. The single phototransistor is indicated at Q1–70. A resistor R1–70 takes the place of the other phototransistor of the FIGURE 8 circuit. A forward bias resistor R2–70 for the phototransistor Q1–70 is added. Otherwise the operation of this circuit is similar to the circuit of FIGURE 8. Since the retroreflective type head usually looks through the flaw to the retroreflective tape, and sees an increase in light, the output signal is normally a positive pulse. However, if the cloth is thin and the flaw thick, the pulse could be negative.

Figure 10:
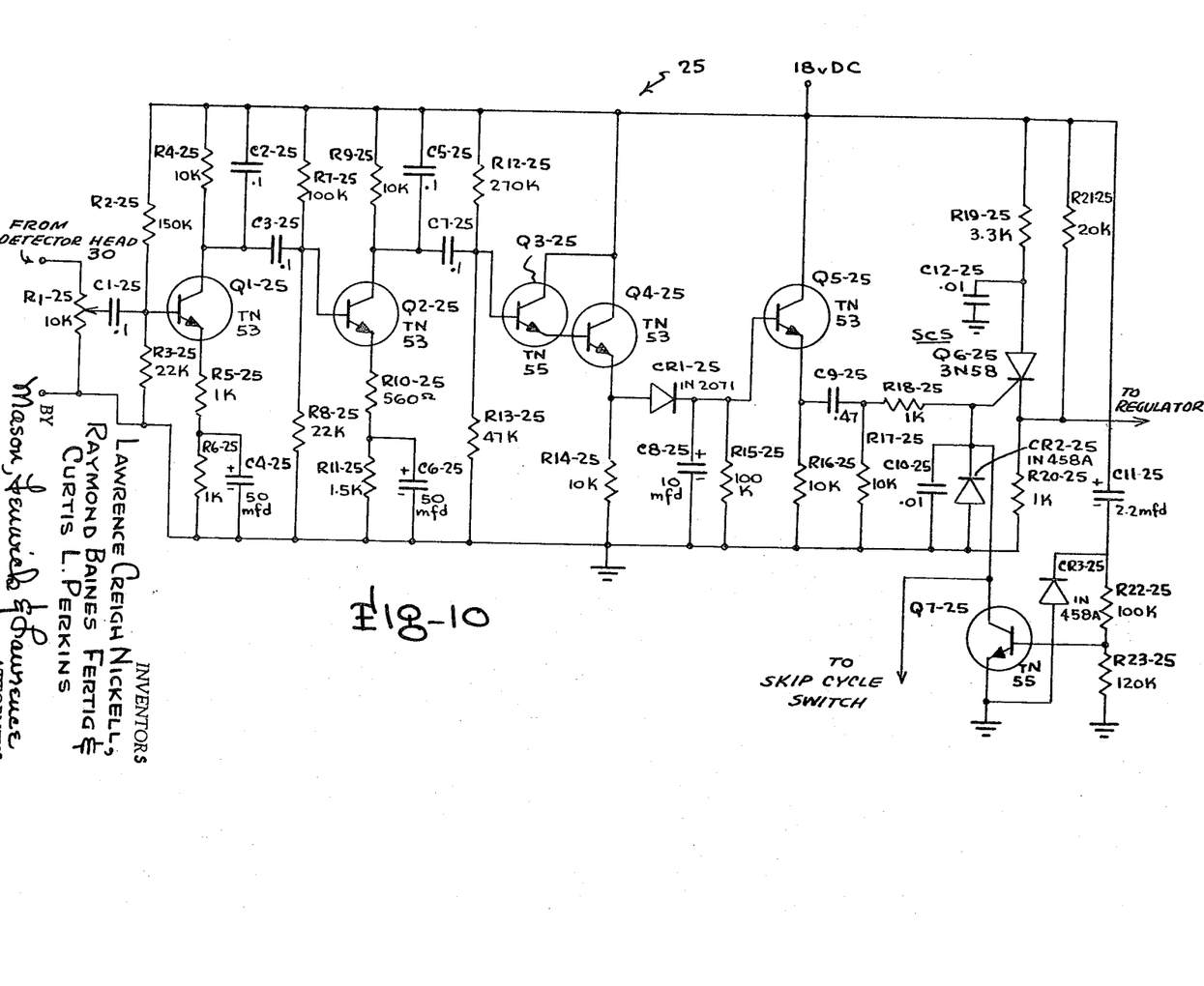
FIGURE 10 is a schematic diagram of the main amplifier unit and time delay provided in the amplifier housing of the traveling sub-assembly.

The amplifier unit 25 consists of a sensitivity control, two stages of voltage amplification, a filter circuit, a silicon controlled switch and a time delay circuit, and is shown schematically in FIGURE 10. The circuit 65 or 70 of the detector head feeds an electrical signal into the sensitivity control R1–25. The signal from the slider of this potentiometer is coupled through capacitor C1–25 to the base of transistor Q1–25. Bias for Q1–25 is provided by the voltage divider consisting of R2–25 and R3–25 and the emitter resistors R5–25 and R6–25. They also provide DC stabilization while R5–25 provides AC feedback to stabilize the gain of the stage. R6–25 is by-passed by C4–25 to limit the amount of AC feedback to that provided by R5–25. Resistor R4–25 is the collector load resistor for Q1–25. C2–25 is a filter for attenuating high frequency noise signals. C3–25 is the coupling capacitor from the collector of Q1–25 to the base of transistor Q2–25. The second stage operates in the same manner as the first stage and further amplifies the signal. Capacitor C7–25 couples the output of Q2–25 to the base of transistors Q3–25 and Q4–25, used in a Darlington type configuration. Q3–25 and Q4–25 are equivalent to a single transistor having a very high input resistance and a very low output resistance. Forward bias for Q3–25 is provided by a voltage divider consisting of resistors R12–25 and R13–25. Resistor R14–25 is the emitter load resistor for Q4–25. The positive pulse appearing across R14–25 is coupled to C8–25 and R15–25 by diode CR1–25. All negative signals are blocked by CR1–25. Any noise signals picked off the cloth of a recurrent nature that get through the first two stages are filtered out by the R–C filter consisting of capacitor C8–25 and resistor R15–25 and built up to a steady DC level. A flaw signal above the level of the noise signals will change C8–25 to a higher voltage and produce a positive pulse. However, high frequency transients will not have time to charge C8–25 due to the output resistance of Q4–25 and forward resistance of CR1–25. The positive pulse appearing across R15–25 is applied to the base of transistor Q5–25, an emitter follower stage having a high input resistance so as to not load C8–25, and a low output resistance to drive the next stage. R16–25 is the emitter load resistor for Q5–25. C9–25 is the coupling capacitor from Q5–25 to resistance R17–25. Resistor R18–25 and C10–25 form a high frequency R-C network for suppressing high frequency noise signals. CR2–25 is a diode for protecting the silicon controlled switch Q6–25 from negative signals that might damage this device, The positive pulse appearing at the gate of Q6–25 triggers Q6–25 if it is about .5 volt higher than the fixed bias provided by the voltage divider consisting of R21–25 and R20–25 connected to the cathode of Q6–25. As soon as Q6–25 fires, a DC level change appears across R20–25. This serves as the output signal of the amplifier. R19–25 is a current limiting resistor for Q6–25 while C12–25 prevents high frequency noise signals for triggering Q6–25.

A time delay circuit of a few seconds is included in the amplifier unit to prevent relay switching transients during automatic reset from triggering Q5–25 and producing false stops. It consists essentially of an R–C circuit and a transistor Q7–25.

When power is applied to the 18 volt DC line during reset, C11–25 is charged through resistors R22–25 and R23–25 in parallel with the base of transistor Q7–25. During this time, a positive voltage appears on the base of Q7–25 causing it to conduct. Since the collector of Q7–25 is connected to the gate circuit of Q6–25, it will prevent any positive signals from triggering Q6–25. It acts like a closed switch to ground. After C11–25 is sufficiently charged so that Q7–25 no longer conducts, no attenuation of the signal to the gate of Q6–25 is present. In other words, the switch to ground is open.

A skip cycle feature is also included in the amplifier unit 25 for use on certain types of cloth where it is necessary to disable the scanner during travel over a part of the cloth which would normally trigger the scanner. This line is connected to a switch mounted on the scanner rail which is closed when the head passes over the area to be skipped. This prevents any signal from reaching the gate of Q6–25 and causing it to fire.

Figure 11:
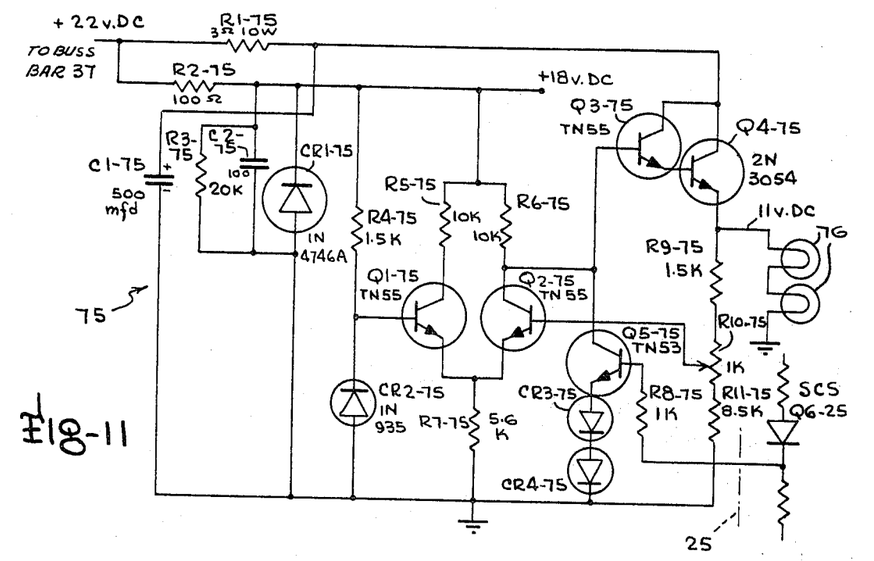
FIGURE 11 is a schematic diagram of the light regulator circuit employed in the travelling sub-assembly.

The light regulator circuit, previously mentioned, for the reflective type head is schematically shown at 75 in FIGURE 11 and is included in the main amplifier housing 25'. It is used to supply 11 volts DC to the two lamps 76 wired in series on the reflective type head. It is also used to cut off the light current and cause relay RE1 to drop out when a flaw is detected. Referring to FIGURE 11, voltage from the 22 volt DC bus bar 37 is filtered by resistor R1–75 and capacitor C1–75 to remove any noise generated by the brushes. This voltage is applied to the collectors of transistors Q3–75 and Q4–75. There is also another filter consisting of R2–75 and C2–75 which removes brush noise from the differential amplifier, consisting of transistors Q1–75 and Q2–75, used in the regulator. Resistor R2–75 also establishes the correct current for zener diode CR1–75 while resistor R4–75 sets the correct current for zener diode CR2–75. The voltage acoss CR2–75 is used as the reference voltage for the differential amplifier. There is a voltage divider composed of R9–75, R10–75, and R11–75 in the emitter of Q4–75. The error voltage is taken from the slider on potentiometer R10–75 which is also used to set the output voltage. If the output voltage to the light goes up, he error voltage on the base of Q2–75 increases. This causes Q2–75 to draw more current and to pass more current through the common emitter resistor R7–75. This change in current is emitter coupled to Q1–75 and causes it to draw less current. This tends to reduce the current through resistor R7–75 which causes Q2–75 to draw slightly more current than it would if Q1–75 was not used. The current through resistor R6–75 establishes the collector voltage of Q2–75. This voltage is connected to the base of Q3–75 which is direct coupled to the base of Q4–75. Q4–75 controls the current to the lamps. With the current through R6–75 increasing, the voltage to the base of Q3–75 decreases. This causes the amount of current passing from the emitter of Q3–75 to the base of Q4–75 to decrease. If the base current of Q4–75 decreases, the collector current also decreases which lowers the voltage across the error voltage divider and brings the error voltage back almost to the correct value depending on the open loop gain of the error amplifier. In this way, the 11 volts DC to the lamp is kept practically constant. A differential amplifier configuration is used to eliminate some of the drift caused by temperature changes which is a problem for all transistor amplifiers.

There is a transistor Q5–75 between the base of Q3–75 and ground. Normally no current flows through Q5–75 because of the diodes CR3–75 and CR4–75 in the emitter and the forward bias of about 1 volt on the base of this transistor. The base of Q5–75 returns to the cathode of the silicon controlled switch Q6–25 in the main amplifier 25 through resistor R8–75. If a flaw causes the Q6–25 to fire, the voltage at its cathode increases to a value high enough to cause Q5–75 to conduct and to remove most of the forward bias on the base of Q3–75, which in turn lowers the current through Q4–75 to a value low enough to cause relay RE1 to drop out. When relay RE1 drops out, other relay circuitry as described in connection with FIGURE 6 is actuated which stops the knitting machine 21.

Figure 12:
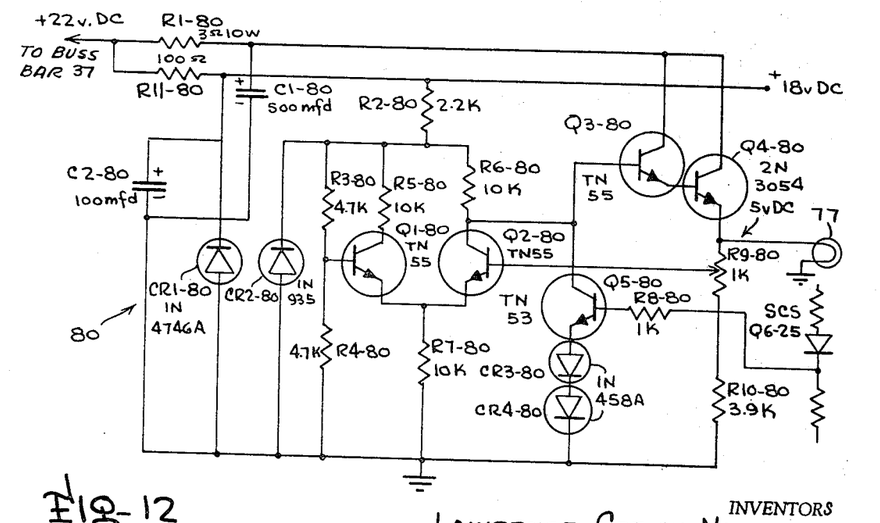
FIGURE 12 is a schematic diagram of the light regulator which is employed when the retro-reflective type scanning head is used.

When the retroreflective type head of FIGURE 9 is used, the 11 volts DC light regulator 75 is replaced by a 5 volt DC light regulator 80, schematically shown in FIGURE 12. Each of the regulators 75 and 80 are in the form of interchangeable circuit boards or panels, either of which may be mounted in the amplifier housing 25'. The circuitry and operation of both regulators 75 and 80 is essentially the same except for the values of some components, and the 5 volt DC output voltage is applied to the lamp 77 to illuminate the fabric.

Figure 13:
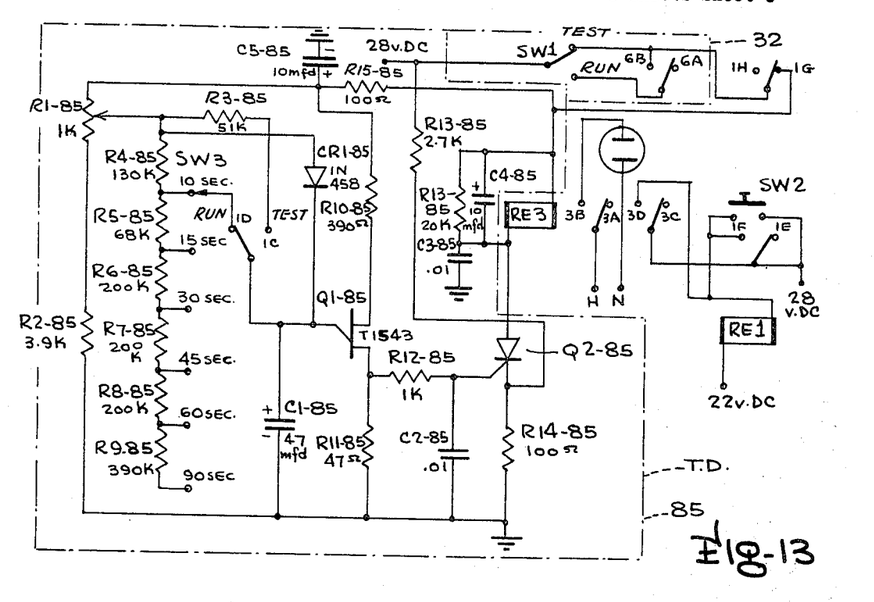
FIGURE 13 is a schematic diagram of the time-delay circuit provided in the amplifier control unit.

A time delay circuit, schematically shown in FIGURE 13 and designated by reference character 85, is located in the amplifier control unit 31. The purpose of this circuit is, after a flaw has been detected and the machine 21 stopped, to let the machine knit by the flaw without stopping again. A six position switch is provided which allows the selection of 10, 15, 30, 45, 60, and 90 second time delays. Referring to FIGURE 13, about 28 volts DC is applied to a voltage divider consisting of resistor R1–85 and R2–85. The voltage for the R–C timing network is obtained from the slider on the potentiometer R1–85 which is the calibration control. Increasing this voltage decreases the time delay, while decreasing this voltage increases this time delay. On the wiring diagram, the time delay switch SW3 is set at the 10 second position. Resistor R4–85 is the timing resistor which is connected to the slider of resistor R1–85. Capacitor C1–85 is charged to about 14 volts DC. At this time, the unijunction transistor Q1–85 fires and discharges C1–85 through base 1 of Q1–85 and R11–85 to ground. This causes a positive pulse to appear across R11–85 which is coupled through R12–85 to the gate of a silicon controlled switch Q2–85. This causes Q2–85 to fire which energizes relay RE3. C4–85 is connected across the coil of relay RE3 to cause it to hold in long enough for relay RE1 to latch. Resistor R13–85 is connected across the coil to make sure Q2–85 fires. It is sometimes difficult to fire a silicon controlled switch with an inductive load such as relay RE3. Capacitor C2–85 filters out high frequency noise signals which might trigger Q2–85.

After Q2–85 fires and energizes relays RE3 and RE1, the 1G contact on relay RE1 breaks the 28 volts DC supply to the time delay circuit 85 and causes it to stop timing. In the Test position of the TEST-RUN switch SW1, contact 1C connects resistor R3–85 into the timing circuit instead of R4–85. This results in a time delay of only a few seconds which saves time when adjusting the sensitivity and checking out the scanner. A diode CR1–85 is connected from capacitor C1–85 to resistor R1–85 to discharge C1–85 after every timing cycle to insure accurate timing regardless of how often the timing cycle is repeated.

While but one embodiment of the present invention for each of the reflective type system and retroreflective type system has been particularly shown and described, it will be apparent that various modifications may be made therein without departing from the spirit and scope thereof, and it is desired therefore that only such limitations be placed thereon as are imposed by the prior art and are set forth in the appended claims.

What is claimed is:

1. Fabric flaw detecing apparatus for a stop-motion system of the type wherein a detector head is relatively scanned along a fabric web as it emerges from a knitting machine for detecting runs, holes and similar flaws in the fabric and producing stop signals to be applied to the knitting machine to stop the same; comprising a movable subassembly including a detector head having photoelectric means for inspecting the fabric along a selected inspection path as it emerges from the knitting machine and producing electric signals responsive to light variations caused by flaws in the fabric and first circuit means for processing said electric signals, a stationary subassembly spaced from said movable subassembly including second circuit means in the supply path of supply current for said first circuit means, said supply path including electrical contact strip means extending along a stationary path and electrically connected to said second circuit means and contact brush means movable relative to and in continuous engagement with said contact strip means and electrically connected with said first circuit means for conducting electrical current therebetween throughout the movement of said movable subassembly, and said first circuit means including means responsive to flaw indicating signals produced by said photoelectric means to alter the supply current drawn from said second circuit means and conducted through said contact strip means and brush means in a manner to activate said second circuit means to produce said stop signals.

2. Fabric flaw detecting apparatus as defined in claim 1, wherein said movable subassembly circuit means includes a regulator circuit electrically coupled through said contact strip means and brush means to said second circuit means, said regulator circuit normally occupying a state drawing such current through said second circuit means as to maintain the same in a condition preventing production of said stop signals, and means responsive to fabric flaw indicating signals from said photoelectric means for changing the current drawn by said regulator circuit to a level causing said second circuit means to produce said stop signals.

3. Fabric flaw detecting apparatus for a stop-motion system of the type wherein a detector head is scanned repeatedly across the width of a fabric web as it emerges from a knitting machine for detecting runs, holes and similar flaws in the fabric and producing stop signals to be applied to the knitting machine to stop the same; comprising a traveling sub-assembly including a detector head having photoelectric means for producing electric signals responsive to light variations caused by flaws in the fabric and traveling circuit means for processing said electric signals, a supporting rail located above and spanning the width of said fabric, carriage means movable on said rail supporting said traveling subassembly thereon for rectilinear reciprocative movement transversely across the fabric width to cause the photoelectric means to inspect the fabric along a rectilinear inspection path, a stationary subassembly at a fixed location relative to said rail including stationary circuit means in the supply path of supply current for said traveling circuit means, said supply path including stationary electrical contact strip means on said rail extending along the length of travel of said traveling subassembly electrically connected to said stationary circuit means and movable contact brush means carried by said carriage means in continuous engagement with said contact strip means and electrically connected with said traveling circuit means for conducting electrical current therebetween throughout the travel of said traveling subassembly, and said traveling circuit means including means responsive to flaw indicating signals produced by said photoelectric means to alter the supply current drawn from said stationary circuit means and conducted through said contact strip means and said brush means in a manner to activate said stationary circuit means to produce said stop signals.

4. Fabric flaw detecting apparatus as defined in claim 3, wherein said traveling subassembly includes lamp means for illuminating the fabric along said inspection path, light control means electrically coupled through said contact strip means and brush means with said stationary circuit means and normally drawing sufficient current therefrom to maintain the latter in a first state preventing production of said stop signals, and said traveling circuit means including regulator means responsive to fabric flaw indicating signals from said photoelectric means for reducing current flow from said stationary circuit means to said lamp means to a level causing activation of said stationary circuit means to produce stop signals.

5. Fabric flaw detecting apparatus as defined in claim 4, wherein said light control means is a light regulator circuit having means for maintaining a substantially constant voltage supply to said lamp means when no fabric flaw indicating signals are being produced by said photoelectric means.

6. Fabric flaw detecting apparatus for a stop-motion system of the type wherein a detector head is scanned repeatedly across the width of a fabric web as it emerges from a knitting machine for detecting runs, holes and similar flaws in the fabric and producing stop signals to be applied to the knitting machine to stop the same; comprising a traveling subassembly including a detector head having photoelectric means for producing electric signals responsive to light variations caused by flaws in the fabric and associated circuit means for processing said electric signals, a supporting rail located above and spanning the width of said fabric, carriage means movable on said rail supporting said traveling subassembly thereon for rectilinear reciprocative movement transversely across the fabric width to cause the photoelectric means to inspect the fabric along a rectilinear inspection path, a stationary subassembly at a fixed location relative to said rail including relay means having a relay coil through which the supply current for said traveling subassembly circuit means is drawn, said rail including stationary electrical contact strip means extending along the length of travel of said traveling subassembly electrically connected to said relay coil, movable contact brush means carried by said carriage means in continuous engagement with said contact strip means and electrically connected with said circuit means for conducting electrical current therebetween throughout the travel of said traveling subassembly, and said circuit means including means responsive to flaw indicating signals produced by said photoelectric means to alter the current drawn through said relay coil and conducted through said contact strip means and said brush means in a manner to activate said relay means to produce said stop signals.

7. Fabric flaw detecting apparatus as defined in claim 6, wherein said traveling subassembly includes lamp means for illuminating the fabric along said inspection path, light control means electrically coupled through said contact strip means and brush means with said relay coil and normally drawing sufficient current through said coil to maintain said relay means in a first state preventing production of stop signals, and said traveling circuit means including regulator means responsive to fabric flaw indicating signals from said photoelectric means for reducing current flow to said lamp means from said relay means to a level causing activation of said relay means to a second state producing said stop signals.

8. Fabric flaw detecting apparatus as defined in claim 7, wherein said regulator means includes a silicon controlled device in a normally non-conducting state which is fired responsive to said electrical signals from said photoelectric means to reduce current flow from said relay coil to said lamp means.

9. Fabric flaw detecting apparatus as defined in claim 2, wherein said first circuit means includes an amplifier for amplifying flaw indicating signals produced by said photoelectric means, a normally non-conductive silicon controlled device responsive to the amplified signals produced by said amplifier to conduct upon occurrence of said flaw indicating signals, and means connecting said silicon controlled device to said regulator circuit to reduce the level of operation thereof to a state causing activation of said second circuit means to produce said stop signals.

10. Fabric flaw detecting apparatus as defined in claim 7, wherein said traveling circuit means includes an amplifier for amplifying flaw indicating signals produced by said photoelectric means, a normally non-conducting silicon controlled device responsive to the amplified signals produced by said amplifier to conduct upon occurrence of said flaw indicating signals, and means connecting said silicon controlled device to said light control means to reduce the level of operation thereof to a state causing activation of said relay means to produce said stop signals.

11. In a fabric flaw detecting apparatus wherein a traveling subassembly including a detector head is scanned repetitively along a rectilinear scan axis above and spanning the width of a fabric web as it emerges from a knitting machine for detecting runs, holes and similar flaws in the fabric and producing stop signals for stopping the knitting machine, a supporting rail located above and spanning the width of the fabric, a trolley movably supported by said rail for supporting the detector head in depending relation therefrom adjacent the fabric, said rail being of upwardly opening substantially U-shaped cross-section having vertical sides, a bottom wall, and inwardly projecting lips at the top of said sides in a common plane defining an upwardly opening slot of narrower transverse dimension than said rail, said trolley having a wheeled structure located within said rail between the sides thereof including wheels bearing upwardly and downwardly against undersurfaces of said lips and upper surfaces of said bottom wall for guiding the trolley in a rectilinear path, and support members projecting externally of said rail from said wheeled structure for supporting said detector head in depending relation below said rail.

12. Fabric flaw detecting apparatus as defined in claim 11, wherein said wheels include a lower set of wheels located in a pair of planes diverging downwardly and outwardly from the center longitudinal vertical plane of said rail to track in the internal corners defined by the sides and bottom wall of said rail.

13. Fabric flaw detecting apparatus as defined in claim 12, wherein said wheels include an upper set of wheels tracking on the under surface of said lips, and said wheeled structure including first and second relatively vertically movable wheel mounts for said upper and lower sets of wheels respectively, and spring loading means urging said first and second wheel mounts in opposite vertical directions to bias said wheels toward their respective tracking surfaces.

14. Fabric flaw detecting apparatus as defined in claim 13, wherein said wheeled structure includes members extending upwardly through said slot having a support platform thereon above said rail and extending laterally beyond a side of the rail, said lips having downwardly projecting rib formations at the edges thereof bounding said slot defining downwardly facing tracks, and said upper set of wheels having peripheral flanges spaced axially of each wheel defining a circumferential groove conforming cross-sectionally to said rib formations to nest thereon with said flanges flanking their associated rib formations.

15. Fabric flaw detecting apparatus as defined in claim 11, including reversible motor means for driving said trolley in forward and reverse directions along said rail, first and second limit switch assemblies at selected limit positions along said rail for reversing the drive direction of said motor means to effect reciprocative travel of the trolley therebetween, said limit switch assemblies each comprising an axially reciprocative plunger in the path of travel of the trolley movable longitudinally of the rail having a magnet fixed therein, a magnetically responsive switch at a stationary location adjacent each of said plungers, means resiliently urging said plungers to a projected position and accommodating movement of the plungers to retracted position upon contact by the trolley, the magnet of one of said plungers being located to magnetically close and permit normal opening of its associated switch at the projected and retracted positions respectively thereof and the magnet of the other plunger being located to permit normal opening and magnetically close its associated switch at the respective projected and retracted positions thereof.

16. In a fabric flaw detecting apparatus wherein a detector head is scanned repetitively along a rectilinear scan axis above and spanning the width of a fabric web as it emerges from a knitting machine for detecting runs, holes and similar flaws in the fabric and producing stop signals for stopping the knitting machine, a supporting rail located above and spanning the width of the fabric, a trolley movably supported by said rail for supporting the detector head adjacent the fabric, reversible motor means for driving said trolley in forward and reverse directions along said rail, first and second limit switch assemblies at spaced positions along said rail for reversing the drive direction of said motor means to effect reciprocative travel of the trolley therebetween, said limit switch assemblies each comprising a stationary case fixed on said rail, an axially reciprocative plunger movably supported therein in the path of travel of the trolley for inward movement relative to the case from a projected position upon contact by the trolley, a magnet fixed in each plunger, and a magnetically responsive switch in each case for assuming a first electrical condition when its associated magnet is directly adjacent thereto and a second electrical condition when its associated magnet is spaced out of active relation therewith, spring means biasing each of said plungers to said projected position, the magnet of one of said plungers being located directly adjacent its associated said switch and the magnet of the other of said plungers being spaced out of active relation with its associated switch when said plungers occupy their projected positions.

17. Fabric flaw detecting apparatus as defined in claim 16, wherein said magnetically responsive switches are reed switches which are normally open and which close responsive to the magnetic field of one of said magnets when the magnet is located directly adjacent thereto.

18. Fabric flaw detecting apparatus as defined in claim 3, wherein said traveling subassembly includes an amplifier supported by said carriage means for movement therewith along said rail coupled with said photoelectric means to amplify said electric signals, the sole electrical supply for said amplifier being derived from said stationary circuit means through said contact strip means and said brush means, and said amplifier including filter means for eliminating noise voltages arising from brush means movement along said contact strip means to render operation of said amplifier responsive to said electrical signals independent of noise voltages produced by said brush means, said amplifier producing outputs upon occurrence of said electric signals for activating said means responsive to flaw indicating signals to alter said supply current to effect production of said stop signals.

19. Fabric flaw detecting apparatus as defined in claim 6, said detector head includes a pair of lamps carried thereby for illuminating the fabric along said inspection path, said photoelectric means comprising a pair of matched phototransistors for responding to reflected light variations in two closely adjacent zones on the fabric, and said detector head including pre-amplifier means therein for amplifying electric signals produced by said phototransistors responsive to light variations sensed thereby.

20. Fabric flaw detecting apparatus as defined in claim 7, wherein said lamp means comprises a single lamp carried by said detector head, said apparatus including retroreflective means beneath the fabric for returning incident light transmitted through fabric flaws along the axis of the incident ray path, said photoelectric means being a single phototransistor, and said detector head including a semitransparent mirror disposed to transmit light from said lamp to the fabric along a selected optical axis and redirect light returned along said optical axis by said retroreflective means to said phototransistor and a preamplifier for amplifying electric signals produced by said phototransistor and apply the same to said regulator means to effect production of said current flow to said single lamp.

No references cited.

RALPH G. NILSON, *Primary Examiner.*

MARTIN ABRAMSON, *Assistant Examiner.*

U.S. Cl. X.R.

66—166; 26—70